United States Patent
Mann (10) Patent No.: US 8,438,744 B1
(45) Date of Patent: May 14, 2013

(54) RULER AND METHOD OF USE

(76) Inventor: Kynan W. Mann, Altadena, CA (US)

( * ) Notice: Subject to any disclaimer, the term of this patent is extended or adjusted under 35 U.S.C. 154(b) by 214 days.

(21) Appl. No.: 13/065,987

(22) Filed: Apr. 4, 2011

(51) Int. Cl.
  *G01B 3/02* (2006.01)
  *G09B 19/02* (2006.01)
(52) U.S. Cl.
  USPC ............ 33/494; 33/491; 33/DIG. 1; 434/188; 434/210
(58) Field of Classification Search .............. 33/494, 33/483, 484, 491, 492, DIG. 1, 679.1; 434/196, 434/188, 191, 195, 210
  See application file for complete search history.

(56) References Cited

U.S. PATENT DOCUMENTS

| | | | | |
|---|---|---|---|---|
| 569,358 A * | 10/1896 | Sommerfeldt | ............... | 33/491 |
| 706,242 A * | 8/1902 | Latshaw | ..................... | 33/494 |
| 1,776,245 A * | 9/1930 | Barrett | ........................ | 33/494 |
| 2,595,458 A * | 5/1952 | Hopfeld | ....................... | 33/494 |
| 2,645,019 A * | 7/1953 | Jones | ........................ | 33/464 |
| 2,926,432 A * | 3/1960 | Helberg | ..................... | 434/196 |
| 4,328,618 A * | 5/1982 | Belanger | ..................... | 33/700 |
| 4,614,042 A * | 9/1986 | Maurer | ........................ | 33/494 |
| 5,881,469 A * | 3/1999 | Monck | ........................ | 33/494 |
| 5,913,586 A * | 6/1999 | Marshall | ..................... | 33/759 |
| 6,813,841 B1 * | 11/2004 | Ramsey | ........................ | 33/494 |
| 7,076,881 B1 * | 7/2006 | Perry | ........................ | 33/494 |
| 8,141,562 B2 * | 3/2012 | Prague | ..................... | 132/301 |

* cited by examiner

*Primary Examiner* — Christopher Fulton
(74) *Attorney, Agent, or Firm* — Ted Masters

(57) ABSTRACT

A ruler includes a base which has a plurality of one-inch wide measurement stations which include numerical indicia. The numerical indicia can be selectively exposed or covered by an associated pivoting flap. When a measurement is made, the appropriate flap is opened so the numerical indicia can be utilized in making a measurement. The numerical indicia can include both fractional numbers and decimal numbers.

9 Claims, 7 Drawing Sheets

RULER AND METHOD OF USE

CROSS REFERENCE TO RELATED APPLICATION

None

TECHNICAL FIELD

The present invention pertains generally to measuring instruments, and more particularly to a ruler which has a plurality of flaps which selectively cover measurement indicia.

BACKGROUND OF THE INVENTION

Rulers are well known in the art, and are used to measure distances and draw straight lines. A ruler usually contains a series of calibrated lines which are used to measure distances. Rulers can be fabricated from wood or plastic, and come in various lengths such as one foot or one yard. In the English system of measurement rulers are divided into one inch segments, with each one inch segment being further divided into fractions of one inch such as ⅛, 1/16, 1/32, etc. These fractional divisions equate to decimal divisions such as 0.125 (⅛), 0.063 (1/16), etc. Since the fractions of an inch are not labeled, it can be difficult to count the divisions when making a measurement.

BRIEF SUMMARY OF THE INVENTION

The present invention is directed to a ruler which simplifies the measuring process. The ruler includes a base which has a plurality of adjacent one-inch wide measurement stations arranged in a row. Each of the one-inch wide measurement stations includes numerical indicia which can be both fractional numbers and decimal numbers. Each one-inch wide measurement station also includes a flap which can be selectively placed in an open position which exposes the indicia and in a closed position which covers the indicia. Measurements are made by opening one of the flaps and using the numerical indicia to determine a dimension of an object.

In accordance with an embodiment of the invention, a ruler includes an elongated base which has an edge and a plurality of one-inch wide measurement stations disposed in a row. Each one-inch wide measurement station includes a number of equally spaced lines disposed along the edge. Each one-inch wide measurement station includes numerical indicia which includes at least one of (1) fractional numbers, and (2) decimal numbers. A corresponding plurality of flaps are disposed adjacent to the plurality of one-inch wide measurement stations, each flap being selectively movable to (1) an open position which exposes the numerical indicia, and (2) a closed position which covers the numerical indicia.

In accordance with another embodiment, the plurality of one-inch wide measurement stations is twelve.

In accordance with another embodiment, the lines are spaced apart one sixteenth of an inch.

In accordance with another embodiment, in the closed position the flap covers both the numerical indicia and the number of equally spaced lines.

In accordance with another embodiment, a pivot axis is disposed in the base, the flap is rotatable about the pivot axis, and the pivot axis is common for all flaps.

In accordance with another embodiment, the flap has an edge opposite the pivot axis, the edge is chamfered, and a gap is created by the chamfered edge.

In accordance with another embodiment, the one-inch wide measurement station includes a first magnet. The flap has a bottom side which includes a second magnet, the first and second magnets cooperating to hold the flap in the closed position.

In accordance with another embodiment, the flap has a top side having a top edge. A number of equally space lines are disposed along the top edge, so that when all of the flaps are moved to the closed position, the ruler has an appearance of a conventional ruler.

In accordance with another embodiment, an index line is disposed on the base. The numerical indicia includes a position index which denotes a position of the one-inch wide measurement station with respect to the index line. The position index is equal to a number of other one-inch wide measurement station disposed between the one-inch wide measurement station and the index line.

In accordance with another embodiment, the numerical indicia includes both fractional numbers and their decimal equivalents.

Other possible embodiments, in addition to the possible embodiments enumerated above, will become apparent from the following detailed description, taken in conjunction with the accompanying drawings, which illustrate, by way of example, the principles of the ruler and method of use.

DETAILED DESCRIPTION OF THE INVENTION

Figure 1:
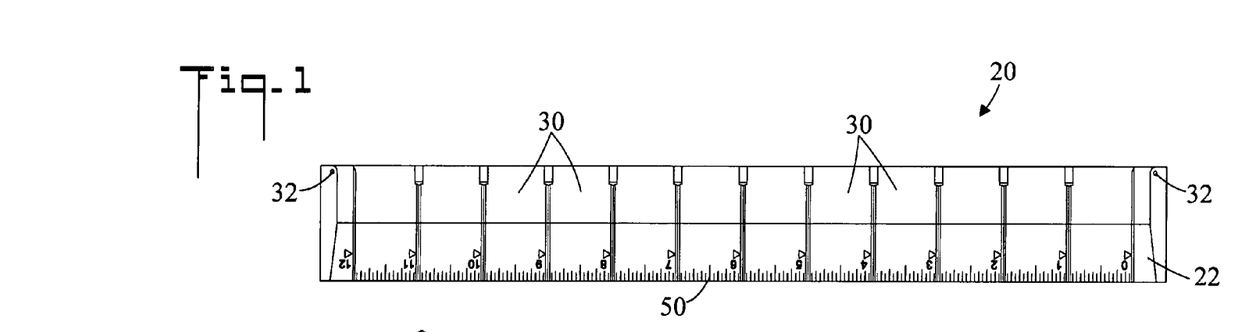
FIG. 1 is top plan view of a ruler in accordance with the present invention.
Figure 2:
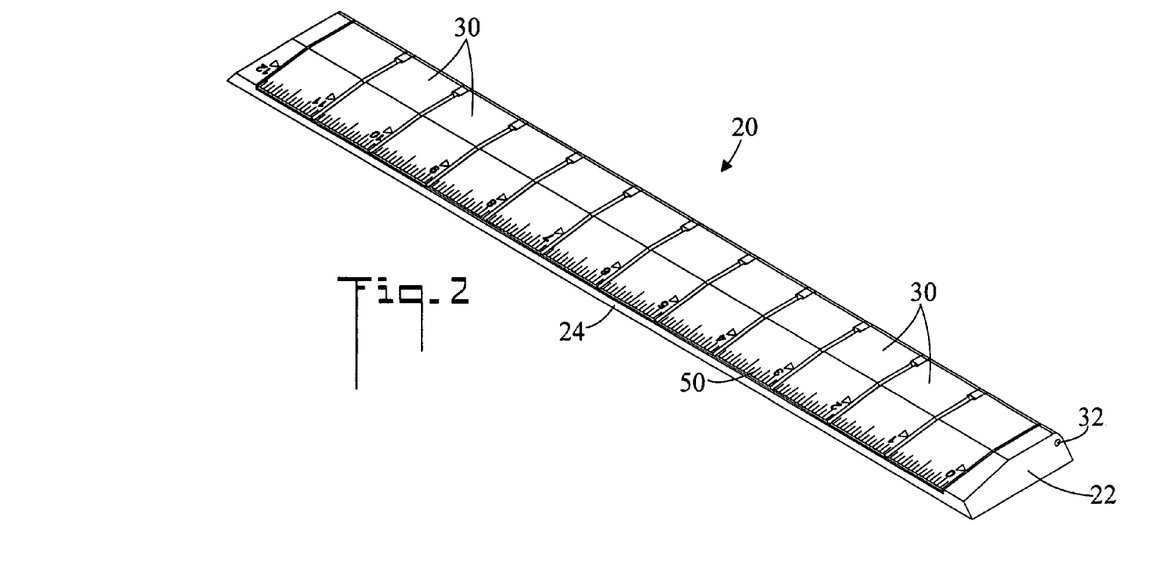
FIG. 2 is a perspective view of the ruler.
Figures 7, 8:
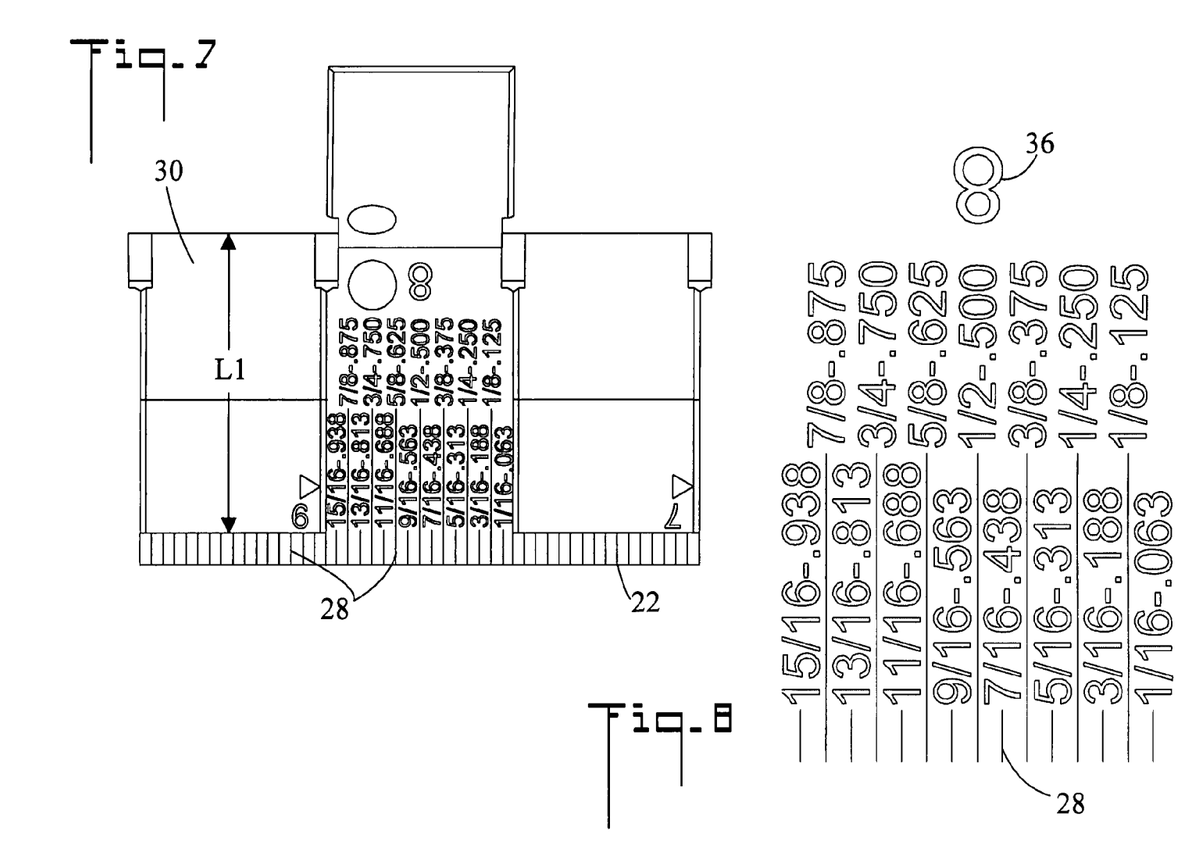
FIG. 7 is an enlarged top plan view of another embodiment flap.
FIG. 8 is an enlarged view of spaced lines and numerical indicia.

Referring initially to FIGS. 1-2, there are illustrated top plan and perspective views respectively of a ruler, generally designated as 20. Also referring to FIGS. 5 and 9, ruler 20 includes an elongated base 22 which has an edge 24 and a plurality of one-inch wide measurement stations 26 disposed in a row in side-by-side relationship. In the shown embodiment, the number of one-inch wide measure stations 26 is twelve making the shown embodiment a 12 inch ruler. It may be appreciated that six one-inch wide measurement stations 26 would result in a six inch ruler, and that 36 one-inch wide measurement stations would result in a 36 inch ruler (a yard stick), etc. Each one-inch wide measurement station 26 also includes a number of equally spaced lines 28 disposed along edge 24 in perpendicular relationship with edge 24. Lines 28 are similar to those found on a conventional ruler, with the exception that some of the lines 28 are longer. In the shown embodiment, the plurality of equally spaced lines 28 are spaced apart one sixteenth of an inch. Each one-inch wide measurement station 26 further includes numerical indicia (also refer to FIG. 8) which includes at least one of (1) fractional numbers, and (2) decimal numbers. A fractional number consists of two numbers separated by a forward slash (division symbol). For example 1/16, 3/8, and 13/16 are fractional numbers. A decimal number consists of at least one digit preceded by a decimal point. For example, 0.125, 0.375, and 0.813 are decimal numbers. Referring also to FIG. 8, in the shown embodiment, the numerical indicia includes both fractional numbers and their decimal equivalents, the two being separated by a dash. For example 5/16-0.313, 9/16-0.563, and 15/16-0.938 comprise fractional numbers and their decimal equivalents. It is noted the fractional numbers and decimal numbers correspond to one of the lines 28 disposed along edge 24 of base 22.

Figure 4:
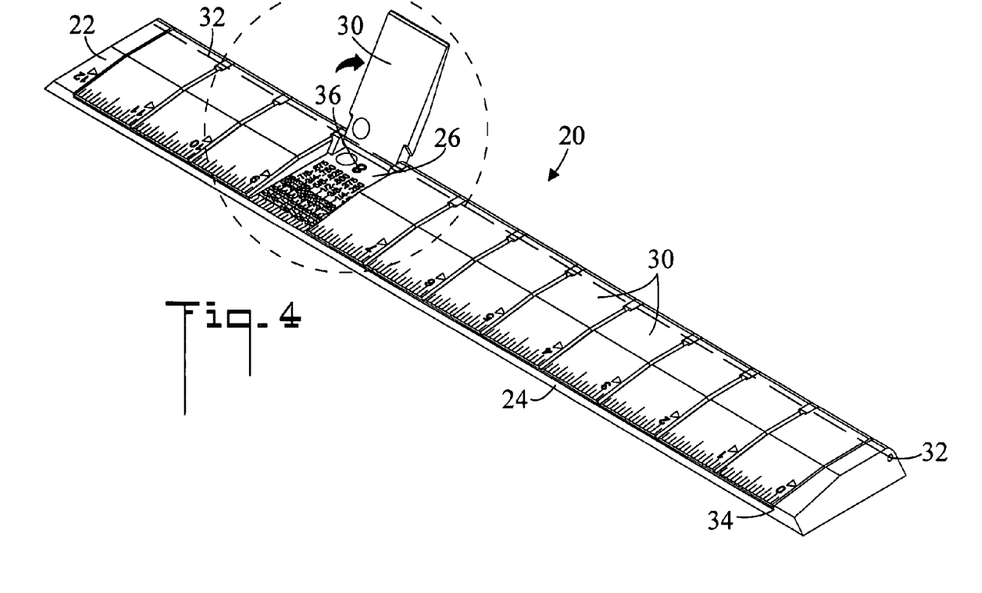
FIG. 4 is a perspective view of the ruler with the flap in the open position.
Figures 5, 6:
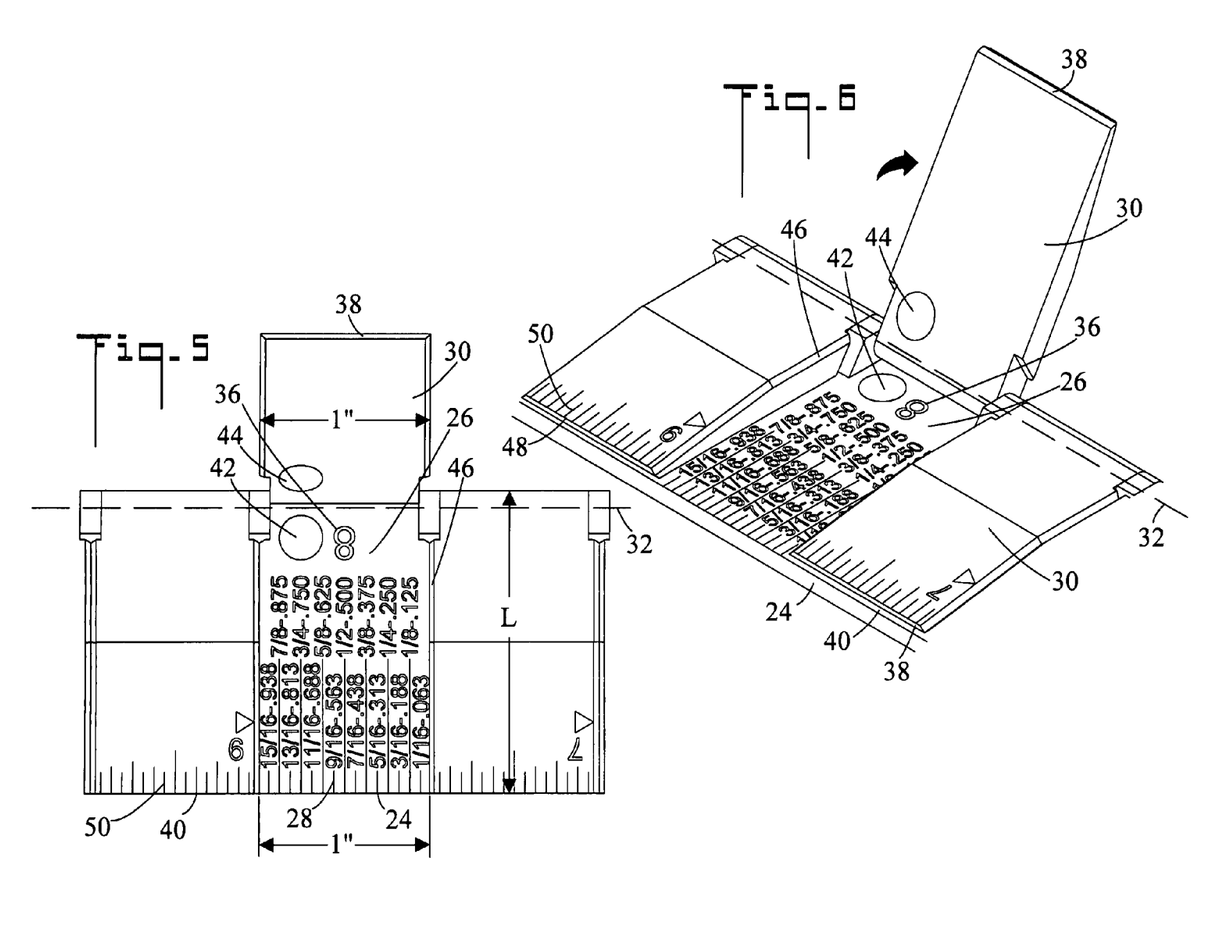
FIG. 5 is an enlarged view of area 5 of FIG. 3.
FIG. 6 is an enlarged view of area 6 of FIG. 4.

Also referring to FIGS. 5-6, ruler 20 further includes a corresponding plurality of one-inch wide flaps 30 disposed adjacent to the plurality of one-inch wide measurement stations 26. Each flap 30 has a length L. Each flap 30 is selectively movable to (1) an open position which exposes the numerical indicia (refer to FIGS. 3-6), and (2) a closed position which covers the numerical indicia (refer to FIGS. 1-6). The term "corresponding plurality" means that there are an equal number of one-inch wide measurement stations 26 and flaps 30, and that each measurement station 26 has its own flap 30. It is noted that in FIGS. 1 and 2, all flaps 30 have been placed in the closed position so that they cover the numerical indicia of each one-inch wide measurement station 26. In FIGS. 3-6, one of the flaps 30 has been moved to the open position so that the numerical indicia disposed below that flap 30 is exposed. Referring to FIGS. 1-6, it is noted that in the shown embodiment in the closed position flap 30 covers both the numerical indicia and the number of equally spaced lines 28 which are disposed on base 22. An embodiment in which flap 30 covers the numerical indicia but not spaced lines 28 is shown in FIG. 7.

Referring to FIGS. 1-6, flap 30 is rotatable about a pivot axis 32 disposed in base 22. Flap 30 is placed in the open position by lifting flap 30 and rotating it about pivot axis 32. In the shown embodiment, pivot axis 32 is common for all flaps 30, and includes a rod which pivotally connects all flaps 30 to base 22.

Referring to FIGS. 3-6 and 9, ruler 20 includes an index line 34 which is disposed on base 22. The numerical indicia of each one-inch wide measurement station 26 includes a position index 36 which denotes a position of one-inch wide measurement station 26 with respect to index line 34. Position index 36 is equal to a number of other one-inch wide measurement station 26 which are disposed between the one-inch wide measurement station 26 and index line 34. For example in FIGS. 3-6, the position index 36 of the exposed one-inch measurement station 26 is "8". This is because there are eight other one-inch wide measurement stations 26 between the exposed one-inch wide measurement station 26 and index point 34. As such, any measurement made at the shown one-inch wide measurement station 26 will be read as "eight inches plus an appropriate portion of one inch.

Figure 3:
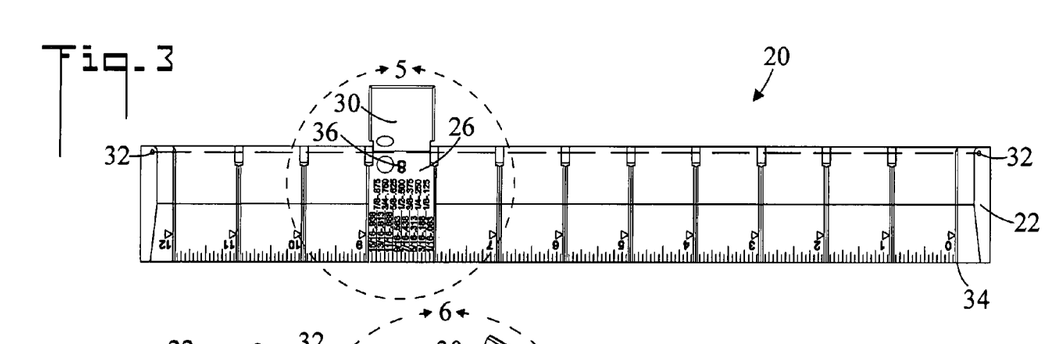
FIG. 3 is a top plan view of the ruler with one flap an open position.

FIGS. 3-4 are top plan and perspective views respectively of ruler 20 with one flap 30 in the open position. Shown are base 22, edge 24, one one-inch wide measurement station 26, open flap 30 and other closed flaps 30, axis of rotation 32, index point 34, and position index 36.

Referring now to FIGS. 5-6, flap 30 has an edge 38 which is opposite pivot axis 32 which is chamfered. When flap is in the closed position, chamfered edge 38 creates a small gap 40 which facilitates the finger engagement of flap 30 to place it in the open position. In another embodiment, one-inch wide measurement station 26 includes a first magnet 42 and flap 30 has a bottom side which includes a second magnet 44. When flap 30 is placed in the closed position, first 42 and second 44 magnets cooperate to hold flap 30 in the closed position. As such, when one flap 30 is opened adjacent flaps 30 are magnetically urged to the closed position as is shown in FIGS. 5-6. In another embodiment the side edges of 46 of flaps 30 are chamfered and can also be colored to differentiate between one inch distances.

Also referring to FIGS. 1 and 2, flap 30 has a top side having a top edge 48. A number of equally spaced lines 50 are disposed along and in perpendicular relationship with top edge 48. Equally spaced lines 50 are in addition to equally spaced lines 26 which are disposed on each one-inch measurement station of base 22. As such, when all flaps 30 are moved to the closed position, because of spaced lines 50, ruler 20 has an appearance of a conventional ruler as is best shown in FIGS. 1 and 2.

Figure 13:
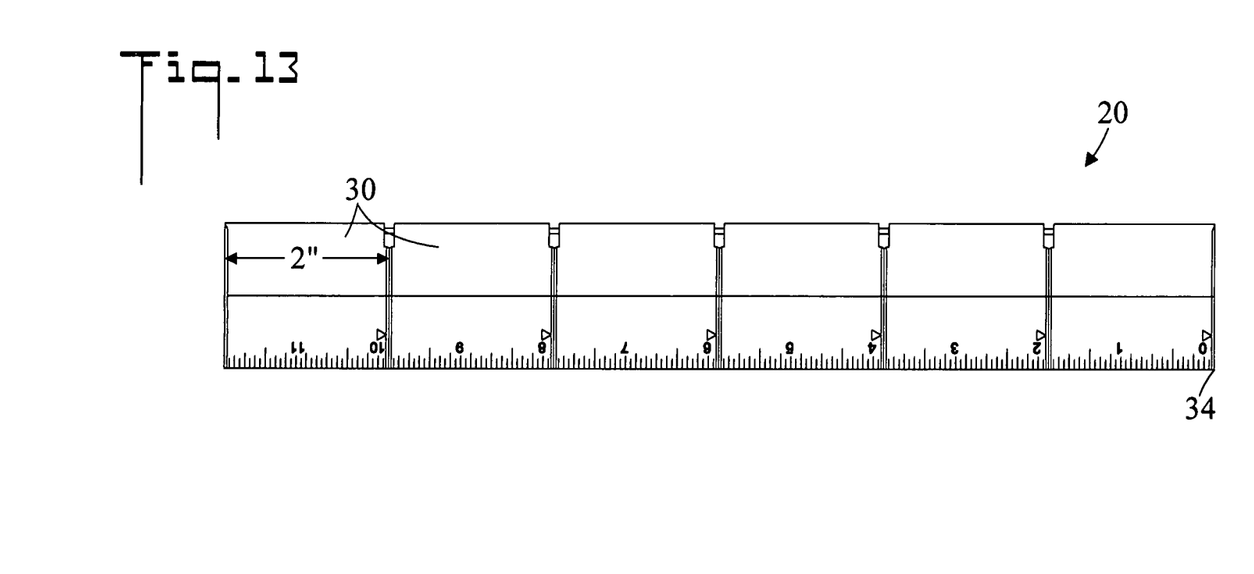
FIG. 13 is a top plan view of a second embodiment of the ruler.

Referring to FIG. 13, in another embodiment, a plurality of flaps 30 is disposed adjacent to the plurality of one-inch wide measurement stations 26, however there are less flaps 30 than one-inch measurement stations 26. Each flap 30 is selectively movable to (1) an open position which exposes the numerical indicia of at least one one-inch measurement station 26, and (2) a closed position which covers the numerical indicia of at least one one-inch measurement station 26. That is, flaps 30 are wider than one-inch measurement stations 26 so that one flap 30 covers more than one-inch wide measurement station 26. For example, flaps 30 could be two-inches wide and cover two one-inch wide measurement stations 26, three-inches wide and cover three one-inch measurement stations 26, etc.

FIG. 7 is an enlarged top plan view of another embodiment flap 30. In this embodiment flap 30 has a length L1 which is shorter than length L of the flap 30 of FIG. 5. As such, when the flap of FIG. 7 is placed in the closed position, it does not cover lines 28 which are disposed on base 22. Also in this embodiment, there are no lines 50 disposed on the top of flap 30.

FIG. 8 is an enlarged view of spaced lines 28, the numerical indicia, and position index 36 of a one-inch wide measurement station 26 (refer to FIG. 5).

Figure 9:
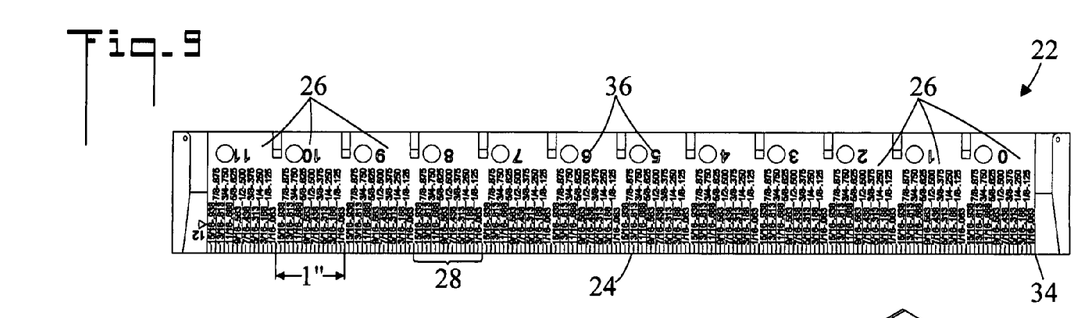
FIG. 9 is a top plan view of the base of the ruler.

FIG. 9 is a top plan view of base 22 of the ruler 20 with flaps 30 removed. In this embodiment base 22 includes 12 one-inch wide measurement stations 26.

Figure 10:
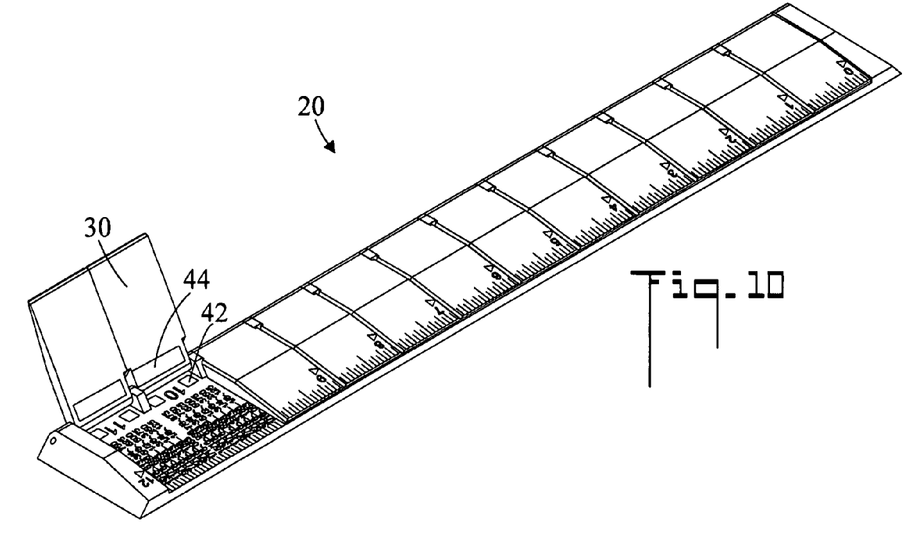
FIG. 10 is a perspective view of the ruler with two flaps in the open position.

FIG. 10 is a perspective view of ruler 20 with two flaps 30 in the open position. In this embodiment first magnet 42 and second magnet 44 are magnetic strips.

Figure 11:
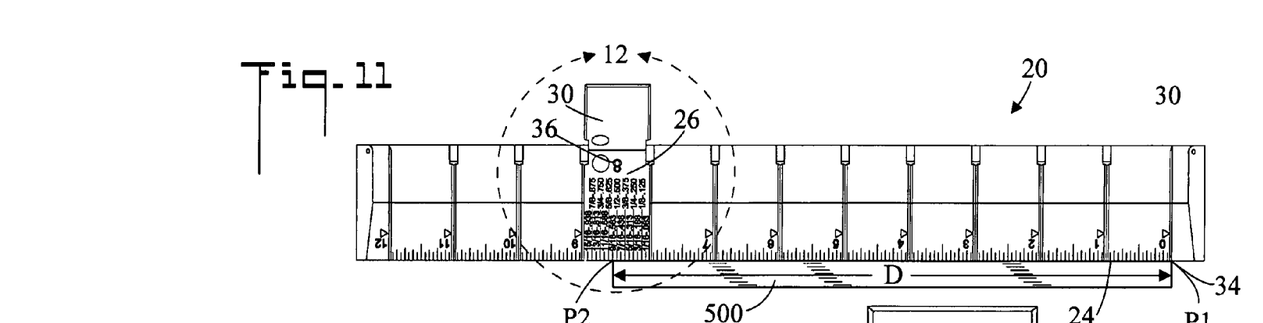
FIG. 11 is a top plan view of the ruler being used to measure an object.
Figure 12:
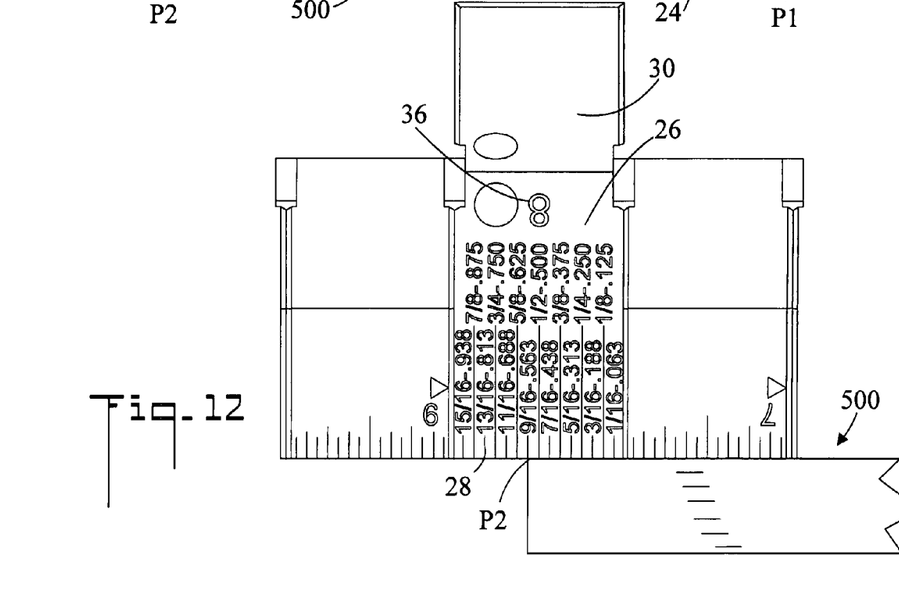
FIG. 12 is an enlarged view of area 12 of FIG. 11.

FIG. 11 is a top plan view of ruler 20 being used to measure an object 500, and FIG. 12 is an enlarged view of area 12 of FIG. 11. Object 500 (a strip) has a first measurement point P1 and a second measurement point P2 and a dimension D therebetween. In the shown embodiment, dimension D is the length of object 500. Edge 24 of base 22 (refer to FIG. 9) is placed alongside object 500 so that said index line 34 is aligned with first measurement point P1 and second measurement point P2 is adjacent to one of the plurality of flaps 30. It is noted that in the shown embodiment, index point 34 coincides with the right edge of the first flap 30 (the flap 30 marked with a "0"). As such, the user does not have to lift up the first flap 30 to view index line 34 when making a measurement.

The user observes which of the plurality of flaps 30 is adjacent to second measurement point P2 (in this case flap 30 having the "8" position index 36, and the user then places that flap 30 (i.e. "8") in the open position thereby exposing numerical indicia of the "8" one-inch wide measurement station 26. The user then uses the plurality of equally spaced lines 28 and the numerical indicia to determine a value of dimension D. In the shown embodiment, dimension D is 8 and 9/16ths or 8.563 inches.

FIG. 13 is a top plan view of a second embodiment of ruler 20. In this embodiment ruler 20 has no end portions so that index line 34 may be placed flush with an object when making a measurement. Also in this embodiment, flaps 30 are two inches wide so that each flap 30 covers two one-inch measurement stations 26.

In another embodiment a metric scale can be disposed on the opposite side of ruler 20.

In terms of use, a method for measuring a dimension of an object includes:

(a) providing an object 500 having a first measurement point P1 and a second measurement point P2 and a dimension D therebetween;

(b) providing a ruler 20 including;
an elongated base 22 having an edge 24 and a plurality of one-inch wide measurement stations 26 disposed in a row;
each one-inch wide measurement station 26 including a number of equally spaced lines 28 disposed along edge 24;
each one-inch wide measurement station 26 including numerical indicia which includes at least one of (1) fractional numbers, and (2) decimal numbers; and,
a corresponding plurality of flaps 30 disposed adjacent to the plurality of one-inch wide measurement stations, 26 each flap 30 selectively movable to (1) an open position which exposes the numerical indicia, and (2) a closed position which covers the numerical indicia;
an index line 34 disposed on base 22;

(c) placing edge 24 alongside object 500 so that index line 34 is aligned with first measurement point P1 and second measurement point P2 is adjacent to one of the plurality of flaps 30;

(d) observing which of the plurality of flaps 30 is adjacent to second measurement point P2, and placing that flap 30 in the open position thereby exposing the numerical indicia; and, (e) using the plurality of equally spaced lines 28 and the numerical indicia to determine a value of dimension D.

The method further including:
before step (c), ensuring that all flaps 30 are in the closed position The method further including:
in step (e), using at least one of the fractional numbers and the decimal numbers to determine the value of dimension D.

The method further including:
in step (b), flap 30 having a pivot axis 32;
in step (b), flap 30 having an edge 38 which is opposite pivot axis 32, edge 38 being chamfered, and a gap 40 created by chamfered edge 38; and,
in step (d), using chamfered edge 38 to place flap 30 in the open position.

The method further including:
in step (b), the numerical indicia including a position index 36 of one-inch wide measurement station 26 with respect to index line 34;
in step (b), position index 36 being equal to a number of other one-inch wide measurement station 26 disposed between the one-inch wide measurement station 26 and index line 34; and,
in step (e), using position index 36 to determine the value of dimension D.

The possible embodiments of the ruler and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the ruler and method of use should be construed as limiting the invention to a particular embodiment or combination of embodiments. The scope of the invention is best defined by the appended claims.

I claim:

1. A ruler comprising:
an elongated base having an edge and a plurality of one-inch wide measurement stations disposed in a row;
each said one-inch wide measurement station including a number of equally spaced lines disposed along said edge of said base, said equally spaced lines being spaced apart one sixteenth of an inch;
each said one-inch wide measurement station including numerical indicia which includes at least one of (1) fractional numbers, and (2) decimal numbers; and,
a corresponding plurality of flaps disposed adjacent to said plurality of one-inch wide measurement stations, each said flap selectively movable to (1) an open position which exposes said numerical indicia, and (2) a closed position which covers said numerical indicia.

2. The ruler according to claim 1, further including:
in said closed position said flap covering both said numerical indicia and said number of equally spaced lines.

3. The ruler according to claim 1, further including:
each said flap having a side edge; and,
said side edge being chamfered and colored.

4. The ruler according to claim 1, further including:
an index line disposed on said base;
said numerical indicia including a position index which denotes a position of said one-inch wide measurement station with respect to said index line;
said position index being equal to a number of other one-inch wide measurement station disposed between said one-inch wide measurement station and said index line; and
a 0 position index disposed on a said one-inch wide measurement station which is disposed adjacent to said index line.

5. The ruler according to claim 1, further including:
said numerical indicia including the following;
1/16-0.063;
1/8-0.125;
3/16-0.188;
1/4-0.250;
5/16-0.313;
3/8-0.375;
7/16-0.438;
1/2-0.500;
9/16-0.563;
5/8-0.625;
11/16-0.688;
3/4-0.750;
13/16-0.813;
7/8-0.875; and,
15/16-0.938.

6. The ruler according to claim 1, further including:
said plurality of one-inch wide measurement stations being twelve;
in said closed position said flap covering both said numerical indicia and said number of equally spaced lines;
said flap having an edge opposite said pivot axis;

said edge being chamfered;
said one-inch wide measurement station including a first magnet;
said flap having a bottom side which includes a second magnet;
said first and second magnets cooperating to hold said flap in said closed position;
said flap having a top side having a top edge;
a number of equally space lines disposed along said top edge;
so that when all of said flaps are moved to said closed position, said ruler has an appearance of a conventional ruler;
an index line disposed on said base;
said numerical indicia including a position index which denotes a position of said one-inch wide measurement station with respect to said index line;
said position index being equal to a number of other one-inch wide measurement station disposed between said one-inch wide measurement station and said index line;
a 0 position index disposed on a said one-inch wide measurement station which is disposed adjacent to said index line;
each said flap having a side edge;
said side edge being chamfered and colored; and,
said numerical indicia including the following;
  $1/16$-0.063;
  $1/8$-0.125;
  $3/16$-0.188;
  $1/4$-0.250;
  $5/16$-0.313;
  $3/8$-0.375;
  $7/16$-0.438;
  $1/2$-0.500;
  $9/16$-0.563;
  $5/8$-0.625;
  $11/16$-0.688;
  $3/4$-0.750;
  $13/16$-0.813;
  $7/8$-0.875; and,
  $15/16$-0.938.

7. A ruler comprising:
an elongated base having an edge and a plurality of one-inch wide measurement stations disposed in a row;
each said one-inch wide measurement station including numerical indicia which includes both fractional numbers and their decimal equivalents;
a plurality of flaps disposed adjacent to said plurality of one-inch wide measurement stations, each said flap selectively movable to (1) an open position which exposes said numerical indicia of two said one-inch measurement stations, and (2) a closed position which covers said numerical indicia of two said one-inch measurement stations.

8. A method for measuring a dimension of an object, comprising:
(a) providing an object having a first measurement point and a second measurement point and a dimension therebetween;
(b) providing a ruler including;
    an elongated base having an edge and a plurality of one-inch wide measurement stations disposed in a row;
    each said one-inch wide measurement station including a number of equally spaced lines disposed along said edge;
    each said one-inch wide measurement station including numerical indicia which includes at least one of (1) fractional numbers, and (2) decimal numbers;
    a corresponding plurality of flaps disposed adjacent to said plurality of one-inch wide measurement stations, each said flap selectively movable to (1) an open position which exposes said numerical indicia, and (2) a closed position which covers said numerical indicia;
    an index line disposed on said base;
(c) placing said edge alongside said object so that said index line is aligned with said first measurement point and said second measurement point is adjacent to one of said plurality of flaps;
(d) observing which of said plurality of flaps is adjacent to said second measurement point, and placing that flap in said open position thereby exposing said numerical indicia; and,
(e) using said plurality of equally spaced lines and said numerical indicia to determine a value of said dimension.

9. The method of claim 8, further including:
in step (b), said numerical indicia including a position index of said one-inch wide measurement station with respect to said index line;
in step (b), said position index being equal to a number of other one-inch wide measurement station disposed between said one-inch wide measurement station and said index line, said position index including a 0 position index disposed on a said one-inch wide measurement station which is disposed adjacent to said index line; and,
in step (e), using said position index to determine said value of said dimension.

* * * * *